United States Patent
Mickelsson et al.

(10) Patent No.: US 7,565,080 B2
(45) Date of Patent: Jul. 21, 2009

(54) SYSTEM AND METHOD FOR INTEGRATING A FIBER OPTIC FIXED ACCESS NETWORK AND A FIBER OPTIC RADIO ACCESS NETWORK

(75) Inventors: Hans Mickelsson, Hägersten (SE); Torbjörn Cagenius, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 250 days.

(21) Appl. No.: 11/622,805

(22) Filed: Jan. 12, 2007

(65) Prior Publication Data
US 2009/0103919 A1 Apr. 23, 2009

Related U.S. Application Data

(63) Continuation of application No. 09/977,396, filed on Oct. 16, 2001, now Pat. No. 7,228,072.

(51) Int. Cl.
*H04B 10/20* (2006.01)
(52) U.S. Cl. ............... 398/58; 398/66; 398/70
(58) Field of Classification Search ............ 398/69–76, 398/58, 66
See application file for complete search history.

(56) References Cited

U.S. PATENT DOCUMENTS

| | | | | |
|---|---|---|---|---|
| 5,559,624 A * | 9/1996 | Darcie et al. | | 398/72 |
| 5,920,410 A * | 7/1999 | Smith et al. | | 398/59 |
| 6,301,032 B1 * | 10/2001 | Osaka et al. | | 398/141 |
| 6,512,616 B1 * | 1/2003 | Nishihara | | 398/54 |
| 2002/0191250 A1 * | 12/2002 | Graves et al. | | 359/128 |
| 2002/0196491 A1 * | 12/2002 | Deng et al. | | 359/124 |
| 2003/0072055 A1 | 4/2003 | Mickelsson et al. | | |

* cited by examiner

*Primary Examiner*—Dzung D Tran

(57) ABSTRACT

A system and method are described for integrating a fiber optic fixed access network and a fiber optic radio access network. At least one radio unit transmits and receives communications with at least one mobile unit. A first multiplexer transmits and receives the communications with the at least one radio unit and fixed access communications with at least one fixed access subscriber. The first multiplexer is connected to each of the at least one radio unit and to each of the at least one fixed access subscriber using fiber optic connections. Each of the at least one radio unit transmits and receives the communications with the first multiplexer using a wavelength that is different for each of the at least one radio unit and different from that used to transmit and receive the fixed access communications from the at least one fixed access subscriber. The communications and the fixed access communications are transmitted and received together between the first multiplexer and a second multiplexer through the fiber optic fixed access network using the different wavelengths.

21 Claims, 5 Drawing Sheets

SYSTEM AND METHOD FOR INTEGRATING A FIBER OPTIC FIXED ACCESS NETWORK AND A FIBER OPTIC RADIO ACCESS NETWORK

CROSS-REFERENCE TO RELATED APPLICATIONS

This application is a continuation of U.S. patent application Ser. No. 09/977,396 filed Oct. 16, 2001 now U.S. Pat. No. 7,228,072.

BACKGROUND

1. Field of the Invention

The present invention relates to fiber optic networks. More particularly, the present invention relates to a system and method for integrating a fiber optic fixed access network and a fiber optic radio access network.

2. Background Information

Fiber optics have been used extensively in transport networks over the last ten to fifteen years and in fixed access networks over the last several years. With the foreseen and on-going deployment of fiber optics in fixed access networks, such as fiber-to-the-home (FTTH), fiber-to-the-building (FTTB), and fiber-to-the-curb (FTTC), a vast amount of fiber optics have been and will be installed in these fixed access networks. These fixed access networks will, in many cases, be Ethernet-based, providing best effort Ethernet services to customers.

Parallel to this deployment, development of future generation mobile networks with smaller and smaller cell radii will be installed. Cellular radio systems with digital fiber optic transmission between a radio unit (antenna part) and the base station will open up a new way of building and planning radio networks in the future. These future generation systems will hereinafter be referred to as fiber-to-the-antenna (FTTA). FTTA is a cost-effective way of distributing radio units in a cellular radio network with small to medium sized cells.

As shown in FIG. 1, a radio base station can comprise a main unit (MU) 150 and a radio unit (RU) 175. MU 150 and RU 175 may or may not be co-located. MU 150 includes the digital baseband components of a base station. For example, MU 150 can include a baseband component 105 and a digital intermediate frequency (IF) processing unit 110. Digital IF processing unit 110 digitally processes radio channel data at an intermediate frequency by performing such functions as filtering, channelizing, modulation, and so forth. RU 175 includes the analog radio parts of the base station. As used herein, a radio unit is the analog radio parts of a base station or other type of transceiver station with direct or indirect connection to a mobile switching center or corresponding device. A radio unit typically serves a particular cell in a cellular communication system. For example, RU 175 can include a receiver 130 connected to an antenna 135 for receiving radio communications from mobile subscriber units. Connected to receiver 130 is an analog-to-digital (A/D) converter 125. A/D converter 125 converts the analog radio communications received by receiver 130 into digital input for transmission to baseband component 105 via digital IF processing unit 110. RU 175 can also include a transmitter 120 connected to either the same or different antenna 135 for transmitting radio communications to mobile subscriber units. Connected to transmitter 120 is a digital-to-analog (D/A) converter 115. D/A converter 115 converts the digital communications received from baseband component 105 via digital IF processing unit 110 into analog output for transmission to the mobile subscriber units. In FTTA, communications traffic between MU 150 and RU 175 is transported over a fiber optic connection.

The primary problem with a fiber optic access network is the enormous cost of installing the fiber optic infrastructure itself, including trenching, opening-up streets, negotiating right-of-way, and so forth. Consequently, it would be advantageous to re-use an existing fiber optic infrastructure for more than one type of access network. FTTH- and FTTC-type networks will use, for example, Ethernet transmission for cost reasons. These networks will also provide fiber dense networks with many possible access points, which is beneficial for radio access network planning if these existing fiber optic networks could be used.

The FTTA link interface is generally not suitable to run using Plesiochronous Digital Hierarchy (PDH), Synchronous Digital Hierarchy (SDH), or Asynchronous Transfer Mode (ATM) transmission protocols. The FTTA link normally requires a synchronous, high-speed, point-to-point connection. Consequently, a separate fiber optic connection would be required for FTTA. Radio access networks and fiber-based fixed access networks are currently built as two separate networks, but installing a fiber optic network solely for FTTA is usually not cost effective.

Ethernet switches currently lack the performance necessary for radio applications. For example, the delays in buffers and inherent best effort properties of Ethernet switches have an impact on the performance of the radio communications traffic. The different synchronization and delay properties of radio communications traffic and Ethernet communications traffic will make it difficult to host both types of traffic in the same type of fiber optic network. For example, the timing requirements of the radio communications traffic are much more stringent than the best effort Ethernet communications traffic running on the Ethernet network. As a result, it is not possible to run time-sensitive radio communications traffic on a standard best-effort-type network. Since different packet sizes, prioritizations, and other delays will not be predictable, a method for secure and reliable transmission of low-delay radio communications traffic is necessary. In a network where the radio communications traffic might pass numerous switches and a complex access network with a high communications traffic load, the radio communications traffic cannot be transmitted with a guaranteed low delay.

It would be desirable to provide a system and method which allows a cellular (mobile) radio access network to coexist on the same fiber optic infrastructure as an Ethernet-based fixed access network.

SUMMARY OF THE INVENTION

A system and method are described for integrating a fiber optic fixed access network and a fiber optic radio access network. At least one radio unit transmits and receives communications with at least one mobile unit. A first multiplexer transmits and receives the communications with the at least one radio unit and fixed access communications with at least one fixed access subscriber. The first multiplexer is connected to each of the at least one radio unit and to each of the at least one fixed access subscriber using fiber optic connections. Each of the at least one radio unit transmits and receives the communications with the first multiplexer using a wavelength that is different for each of the at least one radio unit and different from that used to transmit and receive the fixed access communications from the at least one fixed access subscriber. The communications and the fixed access communications are transmitted and received together between the first multiplexer and a second multiplexer through the fiber optic fixed access network using the different wavelengths.

According to an alternate exemplary embodiment of the present invention, at least one radio unit transmits and receives communications with at least one mobile unit. A first multiplexer transmits and receives the communications with the at least one radio unit and fixed access communications with at least one fixed access subscriber. The first multiplexer is connected to each of the at least one radio unit and to each of the at least one fixed access subscriber using fiber optic connections. Each of the at least one radio unit transmits and receives the communications with the first multiplexer using a wavelength that is the same for each of the at least one radio unit. The first multiplexer converts the communications with each of the at least one radio unit into wavelengths that are different for each of the least one radio unit and different from that used to transmit and receive the fixed access communications with the at least one fixed access subscriber. The communications and the fixed access communications are transmitted and received together between the first multiplexer and a second multiplexer through the fiber optic fixed access network using the different wavelengths.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
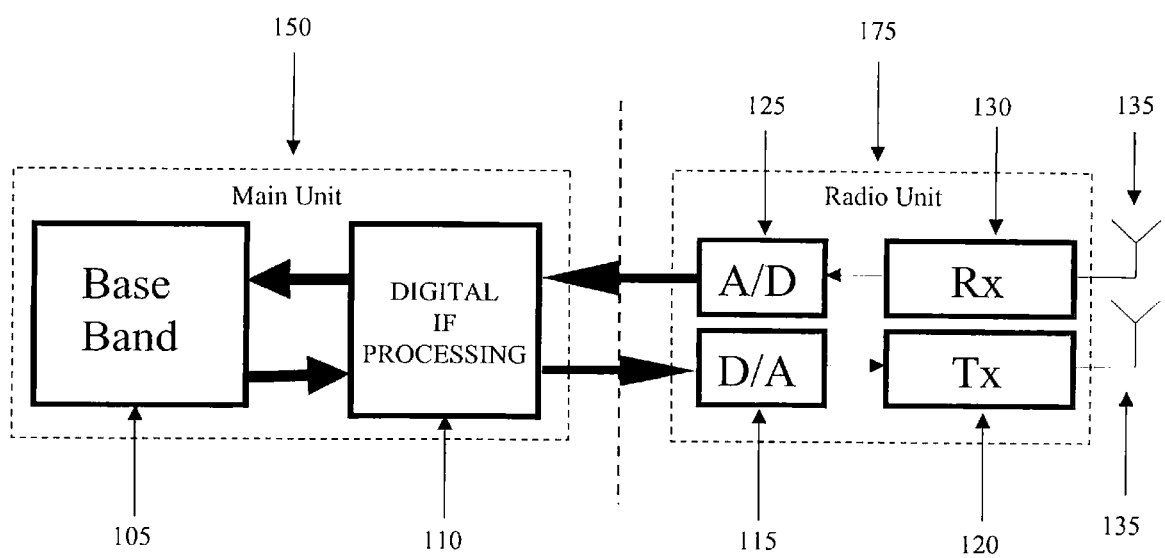
FIG. 1 is a block diagram of a radio base station showing the main unit and the radio unit.
Figure 2:
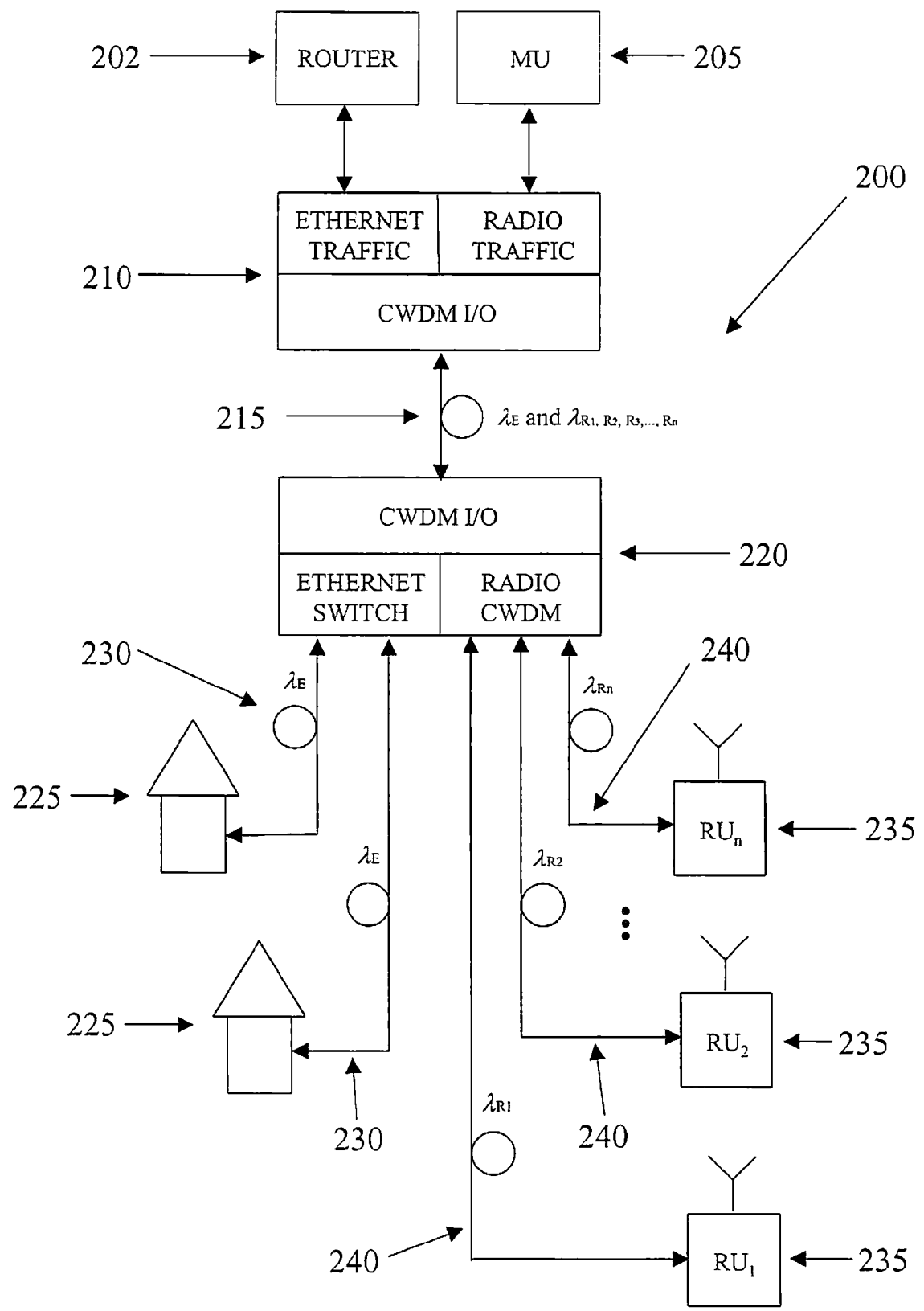
FIG. 2 is a block diagram of a system for integrating a fiber optic fixed access network and a fiber optic radio access network in accordance with an exemplary embodiment of the present invention.

FIG. 2 is a block diagram of a system 200 for integrating a fiber optic fixed access network and a fiber optic radio access network in accordance with an exemplary embodiment of the present invention. System 200 can include at least one radio unit (RU)(e.g., radio units $RU_1$-$RU_n$ 235) for transmitting and receiving communications with at least one mobile unit. System 200 can include a first multiplexer (e.g., first multiplexer 220) for transmitting and receiving the communications with the at least one radio unit and fixed access communications with at least one fixed access subscriber. The first multiplexer can be connected to each of the at least one radio unit and to each of the at least one fixed access subscriber using fiber optic connections. According to exemplary embodiments, the communications with the at least one radio unit and with the at least one mobile unit can be, for example, radio communications traffic or any time-sensitive or high-security communications traffic that cannot be carried over a standard Ethernet network.

It will be recognized by skilled artisans, and will be apparent from the description below, that the term "multiplexer" as used herein is a generic term that describes a device that performs both multiplexing and demultiplexing. It will also be recognized by skilled artisans, and will be apparent from the description below, that the communications can be transmitted from the at least one radio unit (e.g., radio units $RU_1$-$RU_n$ 235) to at least one main unit (e.g., main unit 205) (i.e., the uplink) and from the least one main unit to the at least one radio unit (i.e., the downlink) and that such two-way radio communication can be performed in accordance with exemplary embodiments of the present invention in a similar manner in both the uplink and downlink directions.

According to exemplary embodiments, each of the radio units $RU_1$-$RU_n$ 235 can include a digital fiber optic interface for connecting each radio unit $RU_1$-$RU_n$ 235 to first multiplexer 220 via fiber optic connections 240. According to an alternate exemplary embodiment, each of the radio units $RU_1$-$RU_n$ 235 can include an analog fiber optic interface. Depending on the application and environment. any number of different types of fiber optic cables and optical fibers can be used to connect each radio unit $RU_1$-$RU_n$ 235 to first multiplexer 220 to establish the FTTA link. For the optical fibers, for example, either single-mode or multi-mode optical fibers can be used. However, any desired optical fiber can be used.

According to exemplary embodiments, a two-fiber cable can be used for a FTTA link to connect each radio unit $RU_1$-$RU_n$ 235 to first multiplexer 220. For example, one fiber in the two-fiber cable can be used for uplink communications, i.e., from a radio unit to a main unit, while the other fiber can be used for downlink communications, i.e., from a main unit to a radio unit. However, any desired fiber optic cable can be used.

At least one fixed access subscriber 225 can be connected to first multiplexer 220 via fiber optic connections 230. Fixed access subscribers 225 can communicate over a fixed access network using fixed access communications. According to exemplary embodiments, the fixed access communications can be Ethernet communications. However, any type of communications protocol can be used for the fixed access communications. First multiplexer 220 can include, for example, a standard Ethernet switch to which the fixed access subscribers can be connected. The radio units can be connected to a wavelength multiplexer, such as, for example, an optical coarse wavelength division multiplexing (CWDM) module, that can be included either in the Ethernet switch or as an external module connected to or associated with the Ethernet switch. According to an alternate exemplary embodiment, for larger numbers of radio unit interfaces handled over the same fiber optic connection, for example, an optical dense wavelength division multiplexing (DWDM) module can be used instead of an optical CWDM module.

CWDM is a low-cost wavelength division multiplexing alternative for metropolitan and access applications. The channel spacing can be typically 20 nanometers (nm), which facilitates uncooled devices. Furthermore, compared with DWDM, the relatively high channel spacing allows for more relaxed tolerances in wavelengths for both multiplexers/demultiplexers and transmitters. CWDM is known in the art and is described, for example, in European Patent Application No. EP 0991217 A2, filed Sep. 21, 1999, and published Apr. 5, 2000, the disclosure of which is hereby incorporated by reference.

Each of the at least one radio unit can transmit and receive the communications with the first multiplexer using a wavelength that is different for each of the at least one radio unit and different from that used to transmit and receive the fixed access communications with the at least one fixed access subscriber. Thus, the communications traffic between each radio unit $RU_1$-$RU_n$ 235 and first multiplexer 220 can be carried on a separate wavelength $\lambda_{Rn}$, where n is a specific $RU_{1...n}$ of radio units $RU_1$-$RU_n$ 235. According to exemplary embodiments, the $\lambda_{Rn}$ wavelengths can be in the third wavelength window (e.g., 1550 nm) and separated from each other by a distance large enough to be able to use, for example, uncooled lasers and low-cost filter components.

The fixed access communications traffic between fixed access subscribers 225 and first multiplexer 220 can be carried on a wavelength $\lambda_E$, which can be the same for all fixed access subscribers 225. The $\lambda_E$ wavelength can be a wavelength in the second wavelength window (e.g., 1310 nm) that meets, for example, the Ethernet standard requirements. However, the $\lambda_{Rn}$ wavelengths and the $\lambda_E$ wavelengths can be in any wavelength window at any wavelength, so long as each of the $\lambda_{Rn}$ wavelengths are different from each other and from the $\lambda_E$ wavelengths. If several different wavelengths are used for the fixed access communications traffic (e.g., wavelengths $\lambda_{E1}$ through $\lambda_{En}$), then the $\lambda_{Rn}$ wavelengths would be different from each other and from each of the $\lambda_{En}$ wavelengths.

By using wavelength separation, it is possible to carry both best effort Ethernet communications traffic and time-sensitive communications traffic on the same physical fiber optic infrastructure, because the different requirements of the Ethernet communications traffic and the time-sensitive communications traffic can be accommodated by dedicated components in the multiplexers. Thus, the Ethernet switches can be bypassed and a dedicated, low delay, fully synchronous transmission channel can be created between the radio units and the main units. The use of CWDM technology enables this dedicated channel to co-exist with best effort fixed access services on the same fiber optic access network.

First multiplexer 220 can be connected to a fiber optic fixed access network 215, such as, for example, a point-to-point fiber optic access link. System 200 can include a second multiplexer (e.g., second multiplexer 210), in which the communications and the fixed access communications can be transmitted and received together between the first multiplexer and the second multiplexer through the fiber optic fixed access network using the different wavelengths. Second multiplexer 210 can be, for example, a standard Ethernet switch to which network devices, such as, for example, router 202, can be connected. For the communications, second multiplexer 210 can include a wavelength multiplexer, such as, for example, an optical CWDM module, that can be included either in the Ethernet switch or as an external module connected to or associated with the Ethernet switch. The fixed access communications can be relayed by the Ethernet switch of second multiplexer 210 to router 202 for routing within the fixed access network.

According to exemplary embodiments, the communications and the fixed access communications can be transmitted and received together between the first multiplexer and the second multiplexer using a fiber pair (i.e., a pair of optical fibers) in the fiber optic fixed access network (e.g., fiber optic fixed access network 215). For example, a single fiber in the fiber optic access network can be used for transporting communication traffic from the first multiplexer to the second multiplexer (i.e., the uplink), and a single fiber in the fiber optic access network can be used for transporting communication traffic from the second multiplexer to the first multiplexer (i.e., the downlink). This is achieved in a cost effective manner by means of optical CWDM that allows both the communications and the fixed access communications traffic to be transported over a single fiber in either direction. However, any number of fibers in the fiber optic access network can be used for transporting the communications traffic in both the uplink and downlink directions between the first and second multiplexers.

System 200 can include at least one main unit (MU) (e.g., main unit 205), connected to the second multiplexer (e.g., second multiplexer 210), for transmitting and receiving the communications with the second multiplexer. The main unit can be, for example, the digital baseband parts of a base station. Main unit 205 can be connected to a wavelength multiplexer, such as, for example, an optical CWDM module, that can be included either in the Ethernet switch or as an external module connected to or associated with the Ethernet switch. According to exemplary embodiments, main unit 205 can contain a fiber optic interface, baseband radio processing features, and an interface to a radio network controller (RNC).

By separating the communications traffic on different wavelengths, it is also possible to distribute a reference clock signal throughout system 200. The reference clock signal can be distributed throughout system 200 at a wavelength that is different from that used to transmit and receive the communications with each of the at least one radio unit $RU_1$-$RU_n$ 235 and different from that used to transmit and receive the fixed access communications from the at least one fixed access subscriber 225. Thus, for a reliable reference clock signal distribution within the network, a specific clock wavelength, $\lambda_{CLK}$, that is separate from the $\lambda_{Rn}$ and $\lambda_E$ wavelengths can be used. For example, the $\lambda_{CLK}$ wavelength can be 1625 nm. However, any wavelength that is different from the $\lambda_{Rn}$ and $\lambda_E$ wavelengths can be used for the reference clock signal.

Figure 3A:
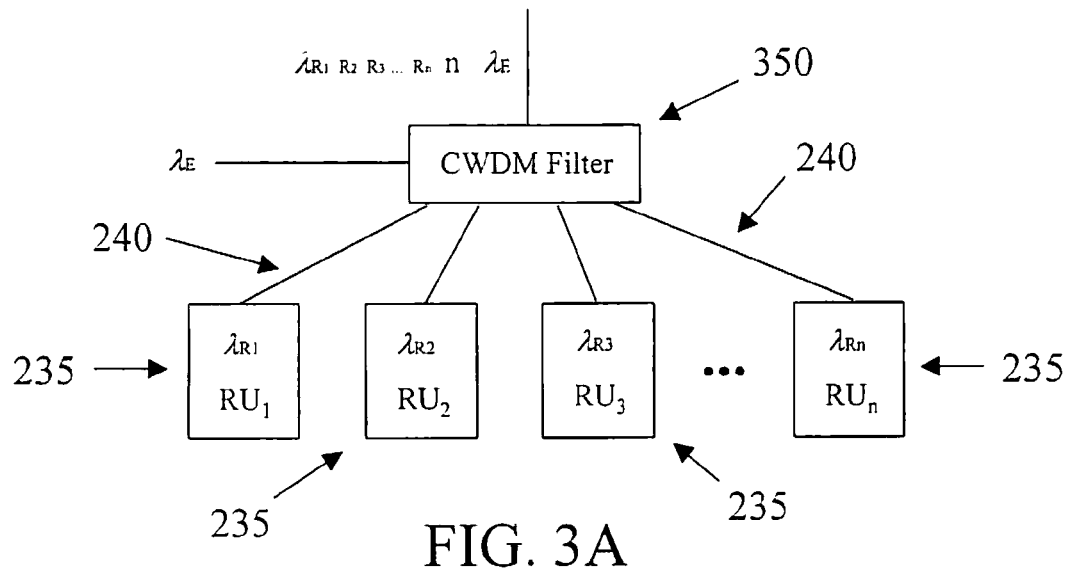
FIGS. 3A and 3B are block diagrams illustrating a passive multiplexer and an active multiplexer, respectively, in accordance with exemplary embodiments of the present invention.

As illustrated in FIG. 3A, according to an exemplary embodiment of the present invention, the optical CWDM modules contained in, connected to, or otherwise associated with first multiplexer 220 and second multiplexer 210 can be passive splitters or filters, such as, for example, passive CWDM filter 350. In other words, first multiplexer 220 and second multiplexer 210 can combine (i.e., multiplex) and separate (i.e., demultiplex) the $\lambda_{Rn}$ wavelengths and the $\lambda_E$ wavelengths to send and receive the combined communications over fiber optic fixed access network 215. However, in this embodiment, neither first multiplexer 220 nor second multiplexer 210 alter the wavelengths of any of the transmitted and received communications signals.

According to an alternate exemplary embodiment, for communications between radio units $RU_1$-$RU_n$ 235 and first multiplexer 220, each of the at least one radio unit $RU_1$-$RU_n$ 235 can transmit and receive the communications with the first multiplexer using a wavelength that is the same for each of the at least one radio unit $RU_1$-$RU_n$ 235. The wavelength $\lambda_R$ can be, for example, either in the second wavelength window (e.g., 1310 nm) or in the third wavelength window (e.g., 1550 nm). However, in this alternate exemplary embodiment, any wavelength can be used so long as it is the same for each of the radio units.

Figure 3B:
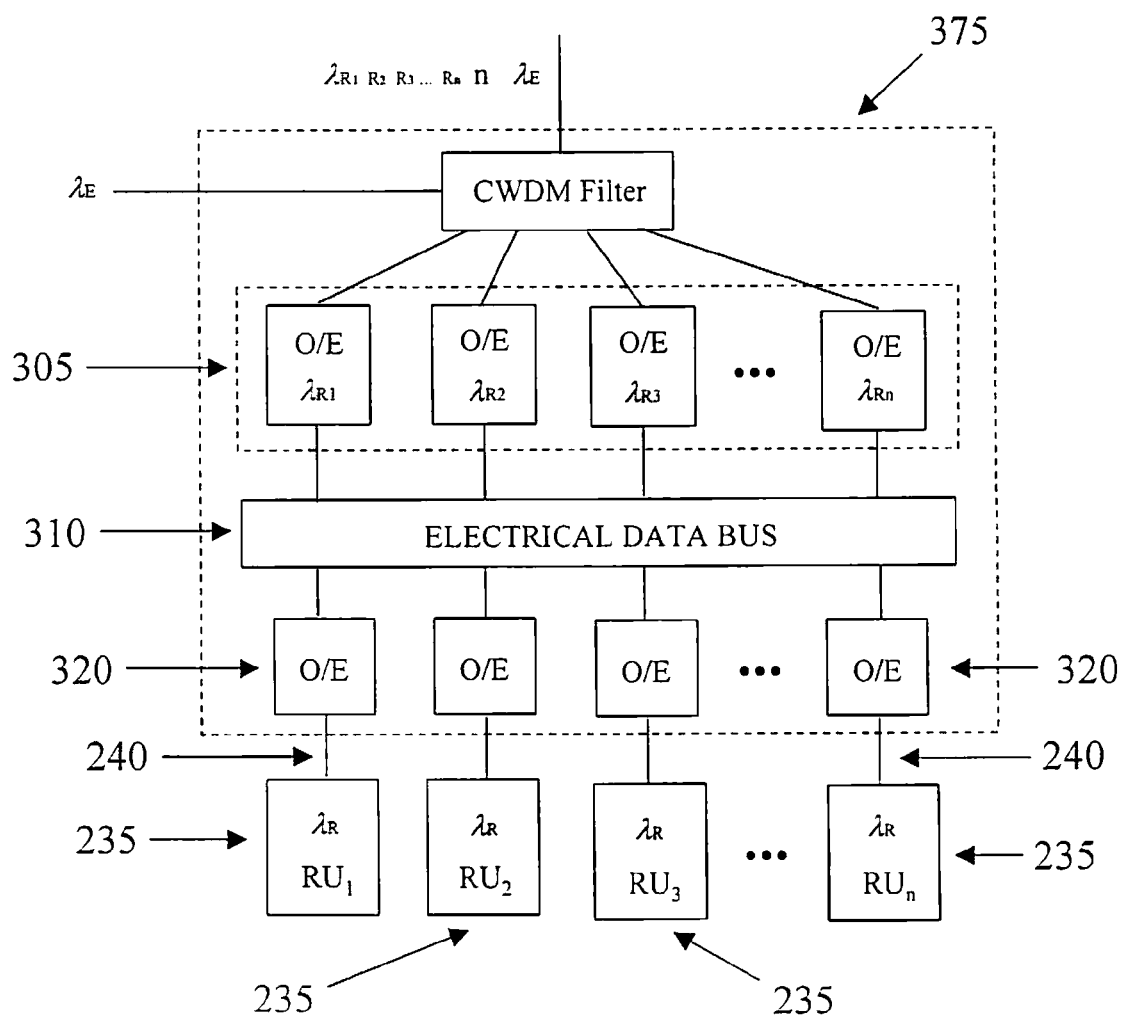

As shown in FIG. 3B, according to this alternate exemplary embodiment, the optical CWDM module either contained in, connected to, or otherwise associated with first multiplexer 220 can have active components, such as, for example, active CWDM filter module 375. In other words, in this embodiment, first multiplexer 220 can alter the wavelengths of the transmitted and received communications signals. Second multiplexer 210 can remain a passive splitter in this alternate exemplary embodiment. The communications traffic to/from the radio units $RU_1$-$RU_n$ 235, each having the same wavelength $\lambda_R$, can be converted in first multiplexer 220 to different, specific wavelengths $\lambda_{Rn}$ for transmission to and reception from second multiplexer 210 over fiber optic fixed access network 215.

Active CWDM filter module 375 can include optoelectronic devices 220 that convert the optical signals from radio units $RU_1$-$RU_n$ 235 into electrical signals that are passed to optoelectronic converters 305 through electrical data bus 310. Optoelectronic converters 305 can include uncooled wavelength specific lasers for transmitting optical signals and optoelectronic detectors for receiving optical signals. The uncooled wavelength specific lasers in optoelectronic converters 305 can convert the electrical signals into optical signals at different wavelengths $\lambda_{Rn}$ for transmission to second multiplexer 210. Upon reception of communications from second multiplexer 210, the optoelectronic detectors in optoelectronic converters 305 in active CWDM filter module 375 of first multiplexer 220 can convert the received optical signals into electrical signals. These electrical signals can be passed to optoelectronic devices 320 via electrical data bus 310, where they can be converted back into optical signals at wavelengths $\lambda_R$ and passed to radio units $RU_1$-$RU_n$ 235. Conversion of communications between electrical and optical signals can be performed in a similar manner in second multiplexer 210 if second multiplexer 210 includes active, rather than passive, components. In either instance, at least one main unit (e.g., main unit 205) for transmitting and receiving the communications with second multiplexer 210 can be connected to second multiplexer 210.

According to this alternate exemplary embodiment, the first multiplexer can convert the communications with each of the at least one radio unit into wavelengths that are different for each of the least one radio unit and different from that used to transmit and receive the fixed access communications with the at least one fixed access subscriber. Consequently, all wavelength specific components can be located in the multiplexer (e.g., first multiplexer 220) and not spread out over several different radio units $RU_1$-$RU_n$ 235. In this alternate exemplary embodiment, the uncooled wavelength specific lasers used in optoelectronic converters 305 can be, for example, either a single laser component or laser array components. In addition, a reference clock signal can be distributed through the fiber optic fixed access network at a wavelength that is different from that used to transmit and receive the communications between each of the at least one radio unit and the first multiplexer and between the first multiplexer and the second multiplexer and different from that used to transmit and receive the fixed access communications with the at least one fixed access subscriber.

According to another alternate exemplary embodiment, a system for integrating a fiber optic fixed access network and a fiber optic radio access network can comprise a first multiplexer (e.g., first multiplexer 220) for transmitting and receiving communications with at least one radio unit (e.g., radio units $RU_1$-$RU_n$ 235) and fixed access communications with a fixed access communications network. The communications and the fixed access communications can be multiplexed onto a fiber optic communications link (e.g., at least one fiber in fiber optic fixed access network 215). The system can also include a second multiplexer (e.g., second multiplexer 210) for transmitting and receiving the multiplexed communications and for transmitting and receiving the fixed access communications with a fixed access network (e.g., via router 202) and the communications with a radio network component (e.g., main unit 205) using the different wavelengths.

According to this alternate exemplary embodiment, each of the at least one remote antenna can transmit and receive the communications with the first multiplexer using a wavelength that is different for each of the at least one radio unit and different from that used to transmit and receive the fixed access communications with the fixed access communications network. Alternatively, each of the at least one radio unit can transmit and receive the communications with the first multiplexer using a wavelength that is the same for each of the at least one radio unit. If the wavelengths of the communications transmitted and received with the radio units are the same, the first multiplexer can convert the communications with each of the at least one radio unit into wavelengths that are different for each of the least one radio unit and different from that used to transmit and receive the fixed access communications with the fixed access communications network.

According to this alternate exemplary embodiment, the first and second multiplexers can be Ethernet switches that each include a wavelength multiplexer. The wavelength multiplexer can perform, for example, optical CWDM. The communications and the fixed access communications can be transmitted and received together between the first multiplexer and the second multiplexer using a fiber pair in the fiber optic fixed access network.

Figure 4:
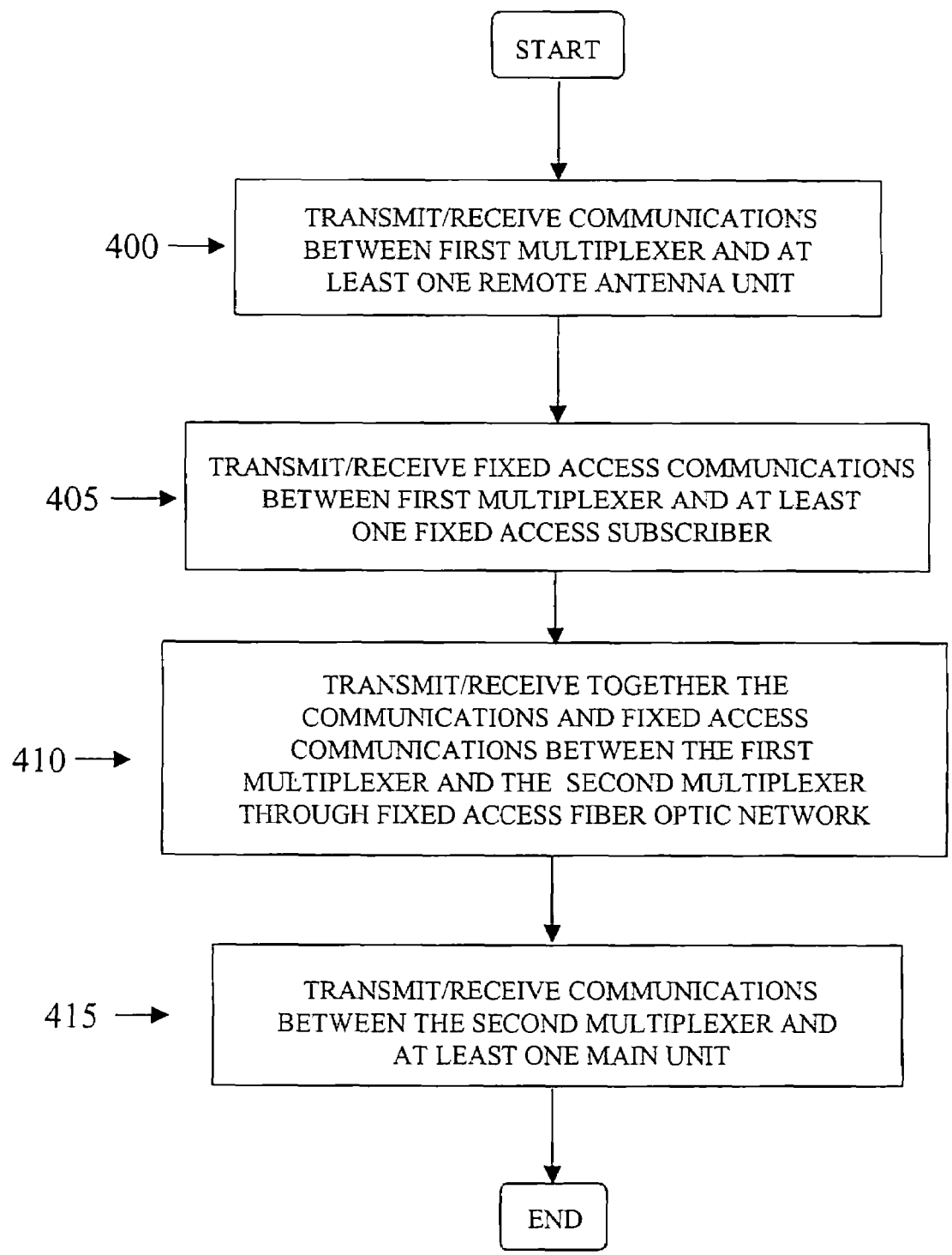
FIG. 4 is a flowchart illustrating the steps for integrating a fiber optic fixed access network and a fiber optic radio access network in accordance with an exemplary embodiment of the present invention.

A method for integrating a fiber optic fixed access network and a fiber optic radio access network will be described with reference to FIG. 4. In step 400, communications can be transmitted and received between at least one radio unit (e.g., radio units $RU_1$-$RU_n$ 235) and a first multiplexer (e.g., first multiplexer 220) via fiber optic connections (e.g., fiber optic connections 240). In step 405, fixed access communications can be transmitted and received between the first multiplexer, and at least one fixed access subscriber (e.g., fixed access subscribers 225). The fixed access communications can be transmitted and received with the first multiplexer via, for example, fiber optic connections 230. According to exemplary embodiments, the fixed access communications can be Ethernet communications. However, any type of communications protocol can be used for the fixed access communications.

The communications transmitted and received with each of the at least one radio unit can be transmitted and received with the first multiplexer using a wavelength that is different for each of the at least one radio unit (e.g., the $\lambda_{Rn}$ wavelengths) and different from that used to transmit and receive the fixed access communications with the at least one fixed access subscriber (e.g., the $\lambda_E$ wavelengths). In step 410, the communications and fixed access communications can be transmitted and received together between the first multiplexer and a second multiplexer (e.g., second multiplexer 210) through a fiber optic fixed access network (e.g., fiber optic fixed access network 215) using the different wavelengths. According to exemplary embodiments, the first and second multiplexers can be Ethernet switches that include a wavelength multiplexer, such as, for example, an optical CWDM module, that can be included either in the Ethernet switch or as an external module connected to or associated with the Ethernet switch. In step 415, the communications can be transmitted and received between the second multiplexer and at least one main unit (e.g., main unit 205) connected to the second multiplexer.

The method can further include distributing a reference clock signal through the fiber optic fixed access network at a wavelength (e.g., the $\lambda_{CLK}$ wavelength) that is different from that used to transmit and receive communications with each of the at least one radio unit (e.g., the $\lambda_{Rn}$ wavelengths) and different from that used to transmit and receive the fixed access communications with the at least one fixed access subscriber (e.g., the $\lambda_E$ wavelengths).

According to exemplary embodiments, the communications and the fixed access communications can be transmitted and received together between the first multiplexer and the second multiplexer using a fiber pair in the fiber optic fixed access network. For example, a single fiber in the fiber optic access network can be used for communication from the first multiplexer to the second multiplexer (i.e., the uplink), and a single fiber in the fiber optic access network can be used for communication from the second multiplexer to the first multiplexer (i.e., the downlink). However, any number of fibers in the fiber optic access network can be used for transporting communications traffic in both the uplink and downlink directions between the first and second multiplexers.

Figure 5:
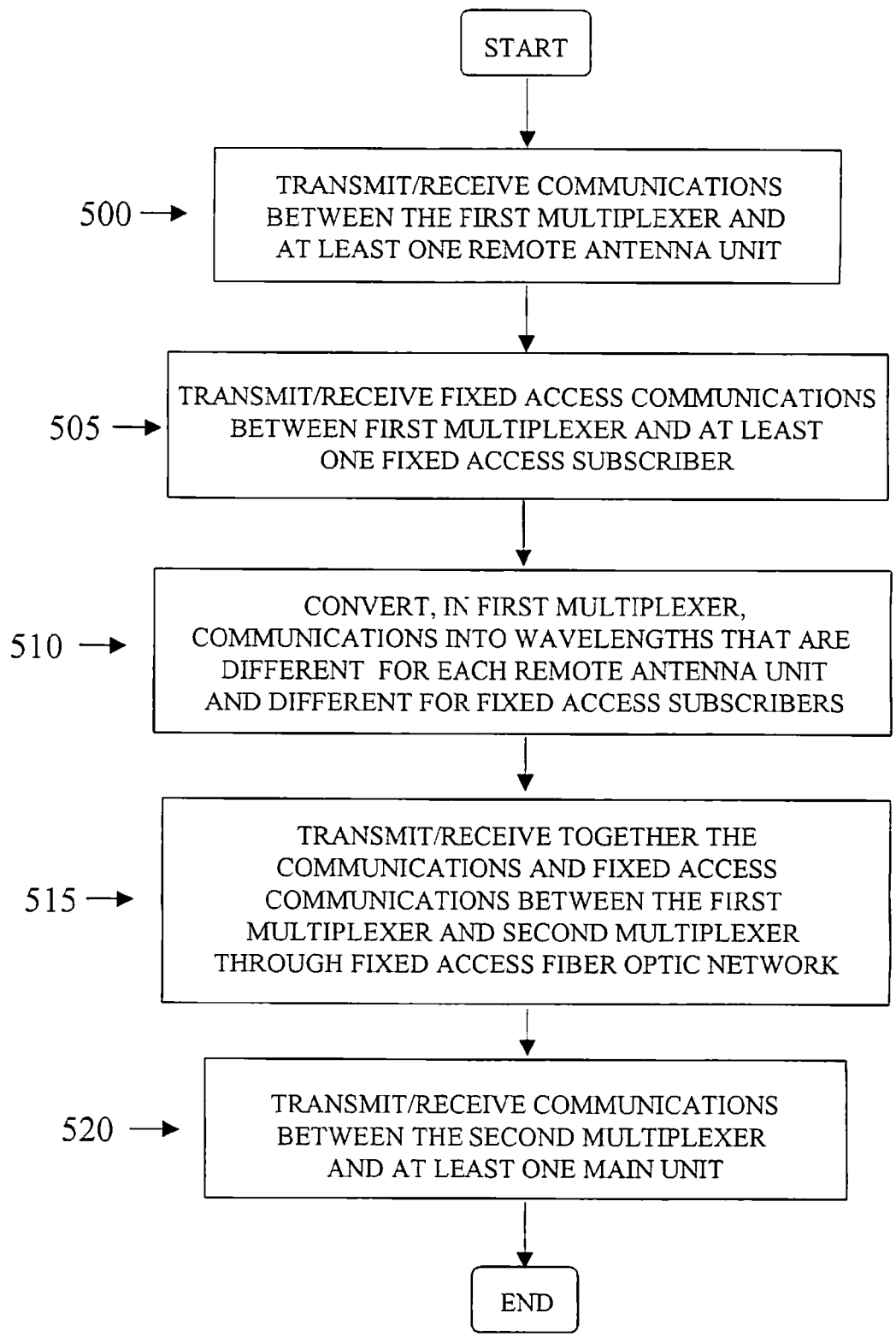
FIG. 5 is a flowchart illustrating the steps for integrating a fiber optic fixed access network and a fiber optic radio access network in accordance with an alternate exemplary embodiment of the present invention.

A method for integrating a fiber optic fixed access network and a fiber optic radio access network in accordance with an alternate exemplary embodiment of the present invention will be described with reference to FIG. 5. In step 500, communications can be transmitted and received between at least one radio unit (e.g., radio units $RU_1$-$RU_n$ 235) and a first multiplexer (e.g., first multiplexer 220) via fiber optic connections (e.g., fiber optic connections 240). In step 505, fixed access communications can be transmitted and received between the first multiplexer (e.g., first multiplexer 220) and at least one fixed access subscriber (e.g., fixed access subscribers 225). The fixed access communications can be transmitted and received with the first multiplexer via, for example, fiber optic connections 230. The communications transmitted and received with each of the at least one radio unit can be transmitted and received with the first multiplexer using a wavelength that is the same for each of the at least one radio unit (e.g., the $\lambda_R$ wavelengths).

In step 510, the communications with each of the at least one radio unit can be converted in the first multiplexer into wavelengths that are different for each of the at least one radio unit (e.g., the $\lambda_{Rn}$ wavelengths) and different from that used to transmit and receive the fixed access communications with the at least one fixed access subscriber (e.g., the $\lambda_E$ wavelengths). In step 515, the communications and fixed access communications can be transmitted together between the first multiplexer and a second multiplexer (e.g., second multiplexer 210) through a fiber optic fixed access network (e.g., fiber optic fixed access network 215) using the different wavelengths. According to exemplary embodiments, the first and second multiplexers can be Ethernet switches that include a wavelength multiplexer, such as, for example, an optical CWDM module, that can be included either in the Ethernet switch or as an external module connected to or associated with the Ethernet switch. In step 520, the communications can be transmitted and received between the second multiplexer and at least one main unit (e.g., main unit 205) connected to the second multiplexer.

The method can further include distributing a reference clock signal through the fiber optic fixed access network at a wavelength (e.g., the $\lambda_{CLK}$ wavelength) that is different from that used to transmit and receive the communications between each of the at least one radio unit and the first multiplexer (e.g., the $\lambda_R$ wavelengths) and between the first multiplexer and the second multiplexer (e.g., the $\lambda_{Rn}$ wavelengths) and different from that used to transmit and receive the fixed access communications with the at least one fixed access subscriber (e.g., the $\lambda_E$ wavelengths).

According to exemplary embodiments, the communications and the fixed access communications can be transmitted and received together between the first multiplexer and the second multiplexer using a fiber pair in the fiber optic fixed access network. For example, a single fiber in the fiber optic access network can be used for communication from the first multiplexer to the second multiplexer (i.e., the uplink), and a single fiber in the fiber optic access network can be used for communication from the second multiplexer to the first multiplexer (i.e., the downlink). However, any number of fibers in the fiber optic access network can be used for transporting communications traffic in both the uplink and downlink directions between the first and second multiplexers.

It will be appreciated by those of ordinary skill in the art that the present invention can be embodied in various specific forms without departing from the spirit or essential characteristics thereof. For example, the radio units (e.g., radio units $RU_1$-$RU_n$ 235) can be replaced by radio base stations (RBSs) and the main unit (e.g., main unit 205) can be replaced by a radio network controller (RNC). In this configuration, a RBS would be connected to the RNC over a fiber optic infrastructure shared with a fixed access Ethernet network.

The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A system for integrating a fiber optic fixed access network and a fiber optic radio access network, wherein a radio base station is divided into a main unit and a plurality of radio units, said main unit comprising a digital baseband component and a digital intermediate frequency processing unit, and the radio units comprising only radio-related components of the base station, the main unit being located remotely from the radio units, said system comprising:

a plurality of radio units for transmitting and receiving radio unit communications with a plurality of mobile units;

a first passive wavelength multiplexer for transmitting and receiving the radio unit communications with the radio units and fixed access communications with a plurality of fixed access subscribers, wherein the first passive wavelength multiplexer is connected to each of the radio units and to each of the fixed access subscribers using fiber optic connections, wherein each of the radio units transmits and receives the radio unit communications with the first passive wavelength multiplexer using a wavelength that is the same for each of the radio units, and wherein the first passive wavelength multiplexer converts the radio unit communications with each of the radio units into wavelengths that are different for each of the radio units and different from that used to transmit and receive the fixed access communications with the fixed access subscribers prior to passively multiplexing the radio unit communications and the fixed access communications onto a fiber optic communications link;

a second passive wavelength multiplexer connected to the first multiplexer through the fiber optic communications link, wherein the radio unit communications and the fixed access communications are transmitted and received together between the first passive wavelength multiplexer and the second passive wavelength multiplexer through the fiber optic fixed access network using the different wavelengths; and at least one main unit, connected to the second passive wavelength multiplexer, for transmitting and receiving the radio unit communications with the second passive wavelength multiplexer and with a radio network.

2. The system according to claim 1, further comprising:
means for distributing a reference clock signal through the fiber optic fixed access network at a wavelength that is different from that used to transmit and receive the radio unit communications between each of the radio units and the first passive wavelength multiplexer and between the first passive wavelength multiplexer and the second passive wavelength multiplexer and different from that used to transmit and receive the fixed access communications with the fixed access subscribers.

3. The system according to claim 1, wherein the first and second passive wavelength multiplexers are implemented in Ethernet switches.

4. The system according to claim 3, wherein the passive wavelength multiplexers perform optical coarse wavelength division multiplexing.

5. The system according to claim 4, wherein the radio unit communications and the fixed access communications are transmitted and received together between the first passive wavelength multiplexer and the second passive wavelength multiplexer using a fiber pair in the fiber optic fixed access network.

6. A system for integrating a fiber optic fixed access network and a fiber optic radio access network, wherein a radio base station is divided into a main unit and a radio access unit, said main unit comprising a digital baseband component and a digital intermediate frequency processing unit, and the radio access unit comprising only radio-related components of the base station, the main unit being located remotely from the radio access unit, said system comprising:
a first passive wavelength multiplexer and a second passive wavelength multiplexer, wherein the first passive wavelength multiplexer includes:
the radio access unit of the radio base station for transmitting and receiving radio unit user communications with at least one mobile radio unit;
a fixed access unit for transmitting and receiving fixed access user communications with fixed access users; and
a passive multiplexer unit for passively multiplexing the radio unit user communications and the fixed access user communications onto a fiber optic communications link; and
wherein the second passive wavelength multiplexer receives the multiplexed communications signal from the first multiplexer, passively de-multiplexes the multiplexed communications, and transmits the fixed access user communications to a fixed access network and transmits the radio unit user communications to the remotely located main unit of the radio base station.

7. The system according to claim 6, wherein each of the at least one radio unit transmits and receives the radio unit user communications with the first passive wavelength multiplexer using a wavelength that is different for each of the at least one radio unit and different from that used to transmit and receive the fixed access user communications with the fixed access communications network.

8. The system according to claim 6, wherein each of the at least one radio unit transmits and receives the radio unit user communications with the first passive wavelength multiplexer using a wavelength that is the same for each of the at least one radio unit, and wherein the radio access unit in the first passive wavelength multiplexer converts the radio unit user communications into wavelengths that are different for each of the least one radio unit and different from that used to transmit and receive the fixed access user communications with the fixed access communications network prior to passively multiplexing the radio unit user communications and the fixed access user communications onto the fiber optic communications link.

9. The system according to claim 6, wherein the first and second multiplexers are passive wavelength multiplexers implemented in Ethernet switches.

10. The system according to claim 9, wherein the passive wavelength multiplexers perform optical coarse wavelength division multiplexing.

11. The system according to claim 10, wherein the radio unit user communications and the fixed access user communications are transmitted and received together between the first passive wavelength multiplexer and the second passive wavelength multiplexer using a fiber pair in the fiber optic fixed access network.

12. A method of integrating a fiber optic fixed access network and a fiber optic radio access network, wherein a radio base station is divided into a main unit and a plurality of radio units, said main unit comprising a digital baseband component and a digital intermediate frequency processing unit, and the radio units comprising only radio-related components of the base station, the main unit being located remotely from the radio units, said method comprising the steps of:
transmitting and receiving radio unit communications between the radio units and a first passive wavelength multiplexer via fiber optic connections,
wherein the first passive wavelength multiplexer also transmits and receives fixed access communications with a plurality of fixed access subscribers, and
wherein the radio unit communications transmitted and received with each of the radio units are transmitted and received with the first passive wavelength multiplexer using a wavelength that is different for each of the radio units and different from that used to transmit and receive the fixed access communications with the fixed access subscribers;
passively multiplexing the radio unit user communications and the fixed access user communications onto a fiber optic communications link in the fixed access network;
transmitting and receiving together the radio unit communications and fixed access communications between the first passive wavelength multiplexer and a second passive wavelength multiplexer through the fiber optic fixed access network using the different wavelengths; and
transmitting and receiving the radio unit communications between the second passive wavelength multiplexer and at least one main unit connected to the second passive wavelength multiplexer and to a radio network.

13. The method according to claim 12, further comprising the step of:
distributing a reference clock signal through the fiber optic fixed access network at a wavelength that is different from that used to transmit and receive the radio unit communications with each of the plurality of radio units, and different from that used to transmit and receive the fixed access communications with the plurality of fixed access subscribers.

14. The method according to claim 12, wherein the first and second passive wavelength multiplexers are implemented in Ethernet switches.

15. The method according to claim 14, wherein the passive wavelength multiplexers perform optical coarse wavelength division multiplexing.

16. The method according to claim 15, wherein the radio unit communications and the fixed access communications are transmitted and received together between the first passive wavelength multiplexer and the second passive wavelength multiplexer using a fiber pair in the fiber optic fixed access network.

17. A method of integrating a fiber optic fixed access network and a fiber optic radio access network, wherein a radio base station is divided into a main unit and a plurality of radio units, said main unit comprising a digital baseband component and a digital intermediate frequency processing unit, and the radio units comprising only radio-related components of the base station, the main unit being located remotely from the radio units, said method comprising the steps of:

transmitting and receiving radio unit communications between the radio units and a first passive wavelength multiplexer via fiber optic connections, wherein the first passive wavelength multiplexer also transmits and receives fixed access communications with a plurality of fixed access subscribers, and wherein the radio unit communications transmitted and received with each of the radio units are transmitted and received with the first passive wavelength multiplexer using a wavelength that is the same for each of the radio units;

converting, in the first passive wavelength multiplexer, the radio unit communications with each of the radio units into wavelengths that are different for each of the radio units and different from that used to transmit and receive the fixed access communications with the fixed access subscribers;

passively multiplexing the radio unit user communications and the fixed access user communications onto a fiber optic communications link in the fixed access network;

transmitting and receiving together the radio unit communications and fixed access communications between the first passive wavelength multiplexer and a second passive wavelength multiplexer through the fiber optic fixed access network using the different wavelengths; and transmitting and receiving the radio unit communications between the second passive wavelength multiplexer and at least one main unit connected to the second passive wavelength multiplexer and to a radio network.

18. The method according to claim 17, further comprising the step of:

distributing a reference clock signal through the fiber optic fixed access network at a wavelength that is different from that used to transmit and receive the radio unit communications between each of the radio units and the first passive wavelength multiplexer and between the first passive wavelength multiplexer and the second passive wavelength multiplexer, and different from that used to transmit and receive the fixed access communications with the fixed access subscribers.

19. The method according to claim 17, wherein the first and second passive wavelength multiplexers are implemented in Ethernet switches.

20. The method according to claim 19, wherein the passive wavelength multiplexers perform optical coarse wavelength division multiplexing.

21. The method according to claim 20, wherein the radio unit communications and the fixed access communications are transmitted and received together between the first passive wavelength multiplexer and the second passive wavelength multiplexer using a fiber pair in the fiber optic fixed access network.

\* \* \* \* \*